(No Model.)
J. H. NICHOLS.
SPECTACLE FRAME.
No. 295,934. Patented Apr. 1, 1884.
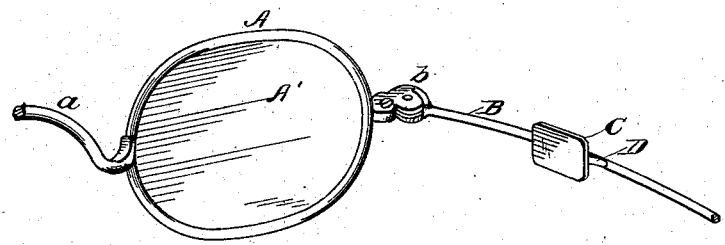
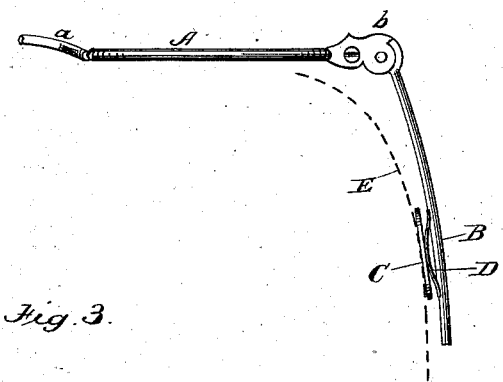
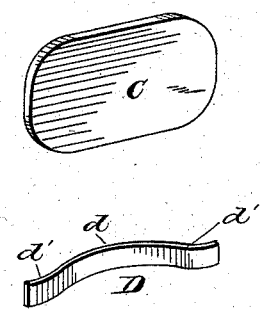
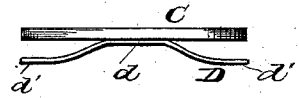
WITNESSES:
INVENTOR
Joseph H. Nichols
by Abraham T. Mayer
Attorney

UNITED STATES PATENT OFFICE.

JOSEPH H. NICHOLS, OF PEORIA, ILLINOIS.

SPECTACLE-FRAME.

SPECIFICATION forming part of Letters Patent No. 295,934, dated April 1, 1884.

Application filed March 17, 1883. (No model.)

*To all whom it may concern:*

Be it known that I, JOSEPH H. NICHOLS, a citizen of the United States, residing at Peoria, in the county of Peoria and State of Illinois, have invented a new and useful Improvement in Spectacle-Frames, of which the following is a specification.

My invention relates to improvements in spectacle-frames; and the object of my improvements is to provide a spectacle-frame which will firmly hold the lenses in the desired position in relation to the eyes, and prevent the movement thereof by shaking, bending the head, stooping, or otherwise.

To the accomplishment of these ends my invention consists in attaching to the rearward-extending arms of the frame and on the inner sides thereof, and at about the point where the arms pass the temples, pieces of rubber, which shall press against the head at the point of contact. The spectacle-frame is thus not only held firmly in position, but is made more easy to the wearer than spectacle-frames not provided with my improvement, by the division of the weight of the eyeglasses and frame between the points where the rubbers are in contact with the head, and that where the ends of the rearward-extending arms are in contact therewith. The rubbers used must not be too hard for easy elasticity.

Any other material possessing a proper degree of elasticity may be used as a substitute for rubber or caoutchouc without departing from the scope of my invention.

In attaching the rubber to the frame, I prefer to solder onto the frame a piece of tin or other metal, and cement the rubber thereto by rubber-mucilage, though the rubber may be attached to the frame by any practicable means without departing from the scope of my invention.

In the drawings, Figure 1 represents a perspective view of a part of a pair of spectacles provided with my improvement. Fig. 2 is a top plan view of the same in place upon the wearer's head, the dotted lines representing the outline of the brow. Figs. 3 and 4 show parts of my improvement in detail.

Similar letters of reference indicate like parts on each figure.

A represents the frame, A' the lens, and $a$ the bow for the nose; B, the rearward-extending arms of the frame, and $b$ the pivotal point at which A and B are connected. C is the rubber plate; D, the tin or other metal attached to the frame at $d$, to which the rubber plate is firmly attached, as above described. $d'$ $d'$ are the points at which the metal is attached to the frame.

The operation of my invention is manifest. The frame being placed in position, the elastic plates C press against the head, thus making the position of the frame firm, and not involuntarily movable by the motions of any part of the body, and also causing much of the weight of the spectacles to lie at the points of contact of the head and elastic plates, as before stated.

Having now fully described my invention, what I claim is—

1. In a frame for eyeglasses, an elastic plate attached to each of the rear-extending arms of the frame, as and for the purpose intended, substantially as described.

2. In a frame for eyeglasses, an elastic plate attached to each of the inner sides of its rear-extending arms at or near the parts where the arms pass the temples, as and for the purpose intended, substantially as described.

3. In a frame for eyeglasses, the combination of the elastic plates C, the metal strap D, and arms B, as and for the purpose intended, substantially as described.

JOSEPH H. NICHOLS.

Witnesses:
ED OSTERBLOOM,
ISAAC J. LEVINSON.